United States Patent
Reed et al.

(10) Patent No.: US 10,625,749 B2
(45) Date of Patent: Apr. 21, 2020

(54) ATTACHABLE VEHICLE CONTROL

(71) Applicant: Ford Global Technologies, LLC, Dearborn, MI (US)

(72) Inventors: Eric L. Reed, Livonia, MI (US); Brian Bennie, Sterling Heights, MI (US); Cheri Lyn Hansen, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 323 days.

(21) Appl. No.: 15/689,524

(22) Filed: Aug. 29, 2017

(65) Prior Publication Data

US 2019/0061773 A1 Feb. 28, 2019

(51) Int. Cl.
*B60W 50/00* (2006.01)
*B60W 30/18* (2012.01)
*G05D 1/00* (2006.01)
*G05D 1/03* (2006.01)

(52) U.S. Cl.
CPC ........ *B60W 50/0098* (2013.01); *B60W 30/18* (2013.01); *G05D 1/0011* (2013.01); *G05D 1/03* (2013.01); *B60W 2050/0064* (2013.01)

(58) Field of Classification Search
CPC ............. B60W 50/0098; B60W 30/18; B60W 2050/0064; G05D 1/0011; G05D 1/03; G08C 17/02; H04B 1/40
See application file for complete search history.

(56) References Cited

U.S. PATENT DOCUMENTS

| | | | |
|---|---|---|---|
| 6,601,669 B1* | 8/2003 | Agnew | B60K 28/10 180/167 |
| 10,509,410 B2* | 12/2019 | Hammond | G05D 1/0223 |
| 2014/0046506 A1 | 2/2014 | Reichel et al. | |
| 2018/0314230 A1* | 11/2018 | Adler | G05B 19/409 |

FOREIGN PATENT DOCUMENTS

| | | | | |
|---|---|---|---|---|
| DE | 102014201012 A1 | 7/2015 | | |
| DE | 102014211548 A1 | 12/2015 | | |
| DE | 102014010002 A1 | 1/2016 | | |
| GB | 2536709 A | * | 9/2016 | B60W 50/08 |
| GB | 2536709 A | | 9/2016 | |

OTHER PUBLICATIONS

Nica, "Review: BMS's Remote Control Parking System Tested in Real Life", BMWBlog.com, Jul. 27, 2016.
"Remote Parking Pilot", https://techcenter.mercedes-benz.com/en/remote-parking-pilot/detail.html, © 2016 Daimler AG.

* cited by examiner

*Primary Examiner* — Abby Y Lin
*Assistant Examiner* — Pum H Thang
(74) *Attorney, Agent, or Firm* — Frank A. MacKenzie; Bejin Bieneman PLC

(57) ABSTRACT

A computer is programmed to receive, in a vehicle, an instruction, via an ultra-short-range transceiver that is mounted underneath a vehicle exterior surface, and actuate a vehicle component based on the received instruction.

15 Claims, 4 Drawing Sheets

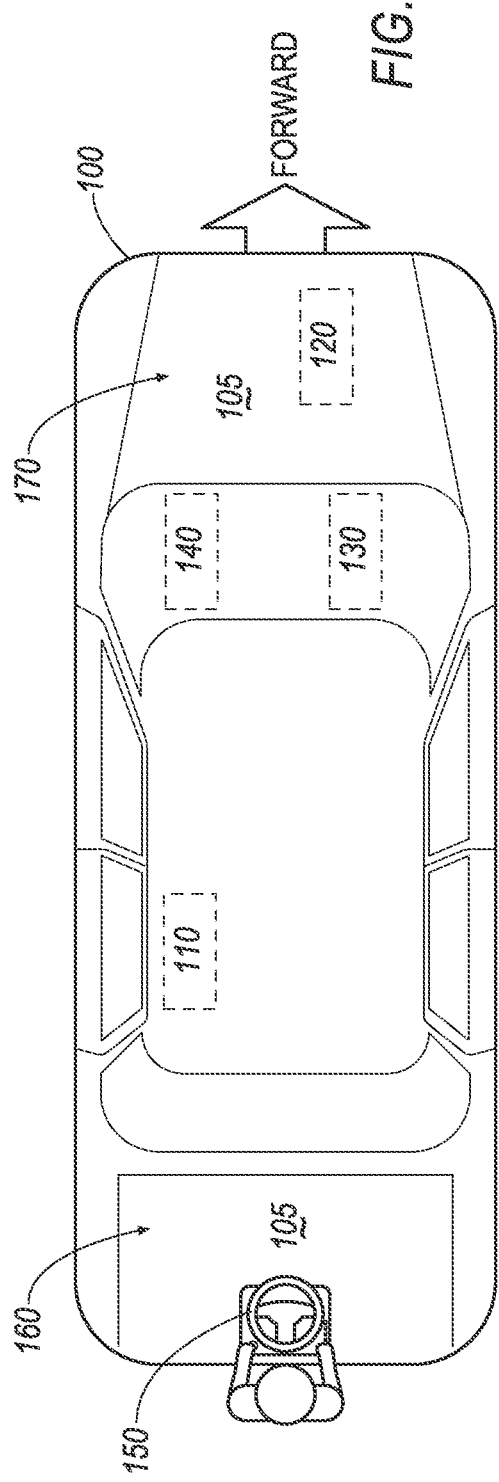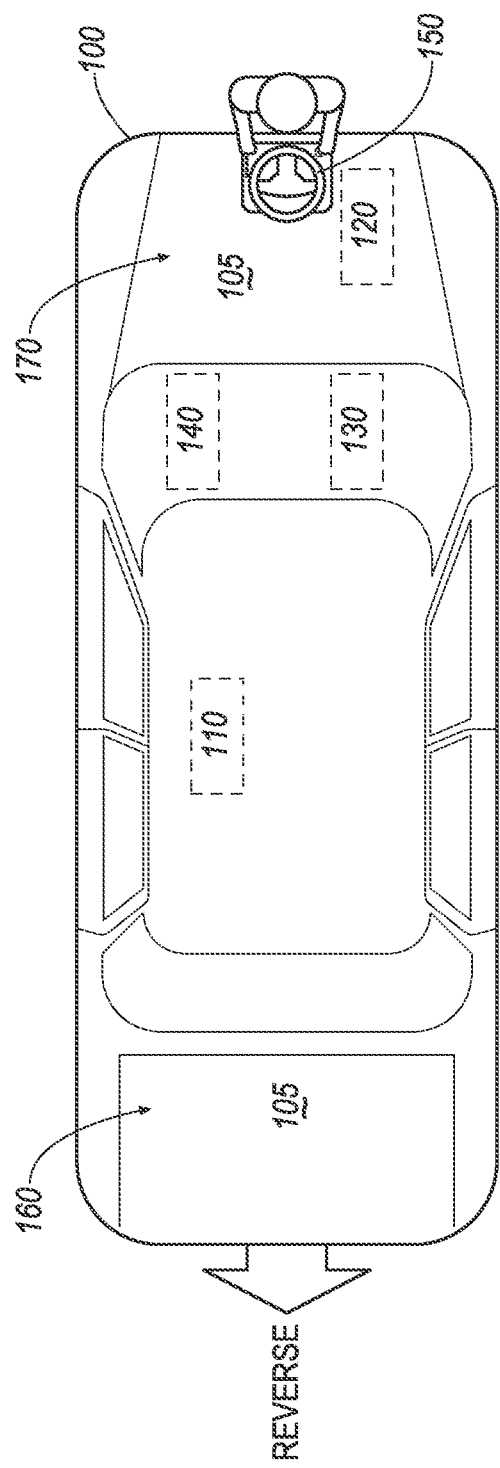

ATTACHABLE VEHICLE CONTROL

BACKGROUND

An autonomous vehicle, sometimes referred to as a self-driving vehicle, may operate partially or entirely without user intervention. For example, a vehicle computer may control vehicle operations such as steering, acceleration, braking, etc. Thus, an autonomous vehicle may lack controls found in non-autonomous vehicles to allow a user to control vehicle movement, e.g., an autonomous vehicle may lack one or more of a vehicle steering wheel, brake pedal, and/or accelerator pedal, etc.

BRIEF DESCRIPTION OF THE DRAWINGS

FIGS. 1A-1B are block diagrams of a vehicle and an exemplary control device attached to a vehicle exterior surface.

DETAILED DESCRIPTION

Introduction

Figure 2:
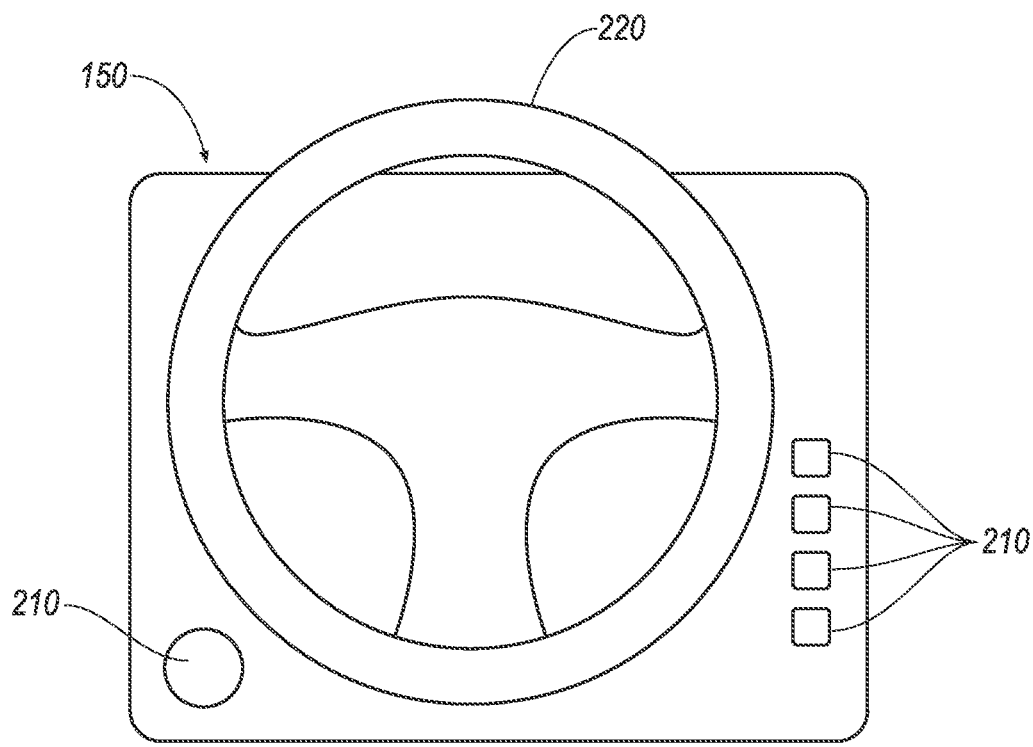
FIG. 2 shows the control device of FIG. 1.

Disclosed herein is a computer that is programmed to receive, in a vehicle, an instruction, via an ultra-short-range transceiver that is mounted underneath a vehicle exterior surface, and actuate a vehicle component based on the received instruction.

The computer may be further programmed to prevent a vehicle backward movement upon determining that a control device is attached to a vehicle trunk exterior surface.

The computer may be further programmed to prevent a vehicle forward movement upon determining that a control device is attached to a vehicle hood exterior surface.

The computer may be further programmed to determine whether the control device is attached to the vehicle hood exterior surface based on a location of the ultra-short-range transceiver in the vehicle.

The received instruction may include at least one of a move forward, move backward, brake, and steer request.

The computer may be further programmed to receive the instruction from a control device attachable to the vehicle exterior surface.

The control device may include a second ultra-short-range transceiver. The second ultra-short-range transceiver may be a Near Field Communication transceiver.

The computer may be further programmed to determine whether the control device is attached to the vehicle exterior surface based on the received instruction.

The ultra-short-range transceiver may be a Near Field Communication transceiver.

Further disclosed herein is a vehicle that includes an ultra-short-range transceiver mounted underneath an exterior surface of the vehicle, and a computer, in the vehicle, that is programmed to receive, an instruction, via the ultra-short-range transceiver, and actuate a vehicle component based on the received instruction.

The computer may be further programmed to receive the instruction from a control device attachable to a vehicle exterior surface.

The computer may be further programmed to receive the instruction from a second wireless transceiver included in the control device.

The control device may be magnetically attachable to the vehicle exterior surface.

The computer may be further programmed to receive the instruction from the control device only when the control device is attached to a section of the vehicle exterior surface above the transceiver.

The ultra-short-range transceiver may include a first transceiver mounted under a vehicle trunk door and a second transceiver mounted under a vehicle hood.

The computer may be further programmed to prevent a vehicle backward movement upon determining that the instruction is received via the first transceiver.

The computer may be further programmed to prevent a vehicle forward movement upon determining that the instruction is received via the second transceiver.

The first transceiver may be a first Near Field Communication transceiver and the second transceiver may be a second Near Field Communication transceiver.

Further disclosed is a computing device programmed to execute the any of the above method steps.

Yet further disclosed is a computer program product, comprising a computer readable medium storing instructions executable by a computer processor, to execute any of the above method steps.

Exemplary System Elements

FIGS. 1A-1B show an example control device 150 attached to a vehicle 100. FIGS. 1A and 1B show the control device 150 attached to a vehicle 100 exterior surface 105. In one example shown in FIG. 1A, the control device 150 is attached to a vehicle 100 trunk 160. In another example shown in FIG. 1B, the control device 150 is attached to a vehicle 100 hood 170.

The vehicle 100 may be powered in a variety of known ways, e.g., with an electric motor and/or internal combustion engine. The vehicle 100 may be a land vehicle such as a car, truck, etc. As depicted in FIGS. 1A-1B, a vehicle 100 may include a computer 110, actuator(s) 120, sensor(s) 130, and a human machine interface (HMI) 140.

The computer 110 includes a processor and a memory such as are known. The memory includes one or more forms of computer-readable media, and stores instructions executable by the computer 110 for performing various operations, including as disclosed herein.

The computer 110 may operate the vehicle 100 in an autonomous, semi-autonomous mode, or non-autonomous mode. For purposes of this disclosure, an autonomous mode is defined as one in which each of vehicle 100 propulsion, braking, and steering are controlled by the computer 110; in a semi-autonomous mode, the computer 110 controls one or two of vehicles 100 propulsion, braking, and steering; in a non-autonomous mode, an operator controls the vehicle 100 propulsion, braking, and steering.

The computer 110 may include programming to operate one or more of land vehicle brakes, propulsion (e.g., control of acceleration in the vehicle 100 by controlling one or more of an internal combustion engine, electric motor, internal combustion/electric hybrid powertrain, etc.), steering, climate control, interior and/or exterior lights, etc.

The computer 110 may include or be communicatively coupled to, e.g., via a vehicle 100 communications bus as described further below, more than one processor, e.g., controllers or the like included in the vehicle for monitoring and/or controlling various vehicle controllers, e.g., a powertrain controller, a brake controller, a steering controller, etc. The computer 110 is generally arranged for communications on a vehicle communication network that can include a bus in the vehicle such as a controller area network (CAN) or the like, and/or other wired and/or wireless mechanisms.

Via the vehicle 100 network, the computer 110 may transmit messages to various devices in the vehicle and/or receive messages from the various devices, e.g., an actuator 120, a sensor 130, etc. Alternatively or additionally, in cases where the computer 110 comprises multiple devices, the vehicle 100 communication network may be used for communications between devices represented as the computer 110 in this disclosure. Further, as mentioned below, various controllers and/or sensors may provide data to the computer 110 via the vehicle communication network.

The vehicle 100 actuators 120 are implemented via circuits, chips, or other electronic and or mechanical components that can actuate various vehicle 100 subsystems in accordance with appropriate control signals as is known. The actuators 120 may be used to control braking, acceleration, and steering of the vehicles 100.

Vehicle 100 sensors 130 may include a variety of devices known to provide data via the vehicle communications bus. For example, the sensors may include one or more cameras, radars, and/or Light Detection and Ranging (LIDAR) sensors 130 disposed in and/or on the vehicle 100 providing data encompassing at least some of the vehicle 100 exterior. A vehicle 100 computer 110 may receive the object data and operate the vehicle in an autonomous and/or semi-autonomous mode based at least in part on the received object data.

The vehicle 100 may include a human machine interface (HMI) 140 that is configured to receive information from a user, such as a human operator, during operation of the vehicle. For example, a user may select a mode of operation, e.g., an autonomous mode, by inputting a requested mode of operation via a user interface device such as included in the HMI 140. Moreover, a user interface device may be configured to present information to the user. Thus, an HMI 140 may be located in a passenger cabin of the vehicle 100. In an example, the computer 110 may output information indicating that a vehicle 100 mode of operation such as an autonomous mode is deactivated due to, e.g., receiving control instructions from the control device 150.

As shown in FIG. 2, the control device 150 may receive user input and transmit such inputs to the vehicle 100 computer 110. The control device 150 may include input elements 210 such as knobs, buttons, levers, etc. The control device 150 may include a steering wheel 220. The control device 150 is typically attached, e.g., magnetically (as discussed below), to the vehicle 100 exterior surface 105 as a means for a user to provide such inputs.

An autonomous vehicle 100 may lack a steering wheel, an accelerator and/or brake pedal because a computer 110 may operate the vehicle 100 without user input. However, in various circumstances, such as a failure in a sensor 130, a computer 110, etc., and/or during maintenance or repair in a service center, etc., an autonomous vehicle 100 may be operated in a non-autonomous mode. Thus, user inputs including a requested steering angle, an acceleration request, and/or a requested brake pressure may be provided via the control device 150.

Figure 3:
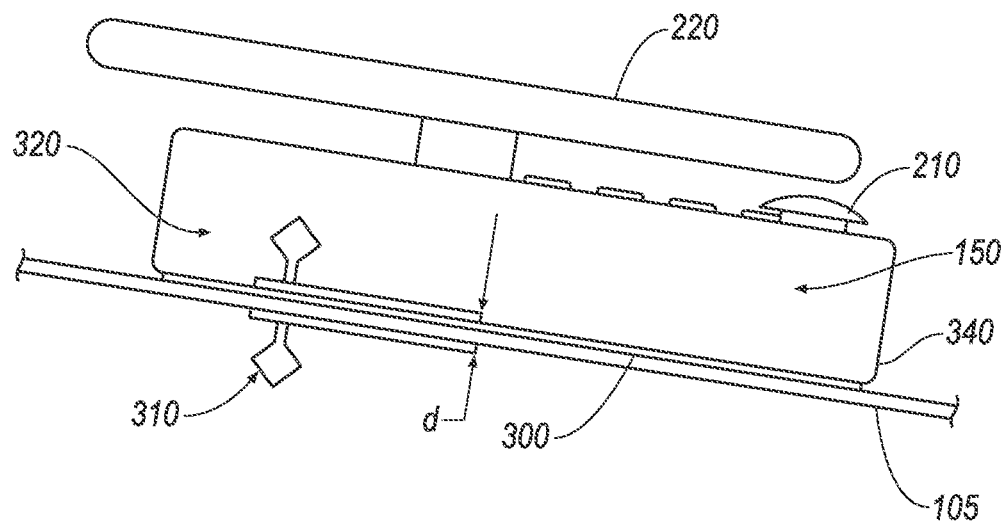
FIG. 3 shows the control device having an ultra-short-range Communication transceiver, and a portion of the vehicle exterior surface.

With reference to FIG. 3, the vehicle 100 computer 110 is programmed to receive an instruction, via an ultra-short-range transceiver 310 that is mounted underneath the vehicle 100 exterior surface 105. The computer 110 is further programmed to actuate a vehicle 100 component, e.g., an actuator 120, based on the received instruction. The computer 110 can be programmed to receive the instruction from the control device 150 attachable to the vehicle 100 exterior surface 105.

"Ultra-short-range" communications, as that term is used in this disclosure, means a communication protocol that operates between transceivers that are in close proximity to one another, where close proximity is defined as no more than ten centimeters, and in many examples means four centimeters or less. The example ultra-short-range protocols in this disclosure are Near Field Communications (NFC), and therefore ultra-short-range transceivers 310, 320 are sometimes referred to in the context of the examples disclosed herein as NFC transceivers 310, 320. NFC is a set of communication protocols that enable two electronic devices, e.g., the vehicle 100 computer 110 and the control device 150, to establish communication by bringing the NFC transceivers 310, 320 within a close proximity of each other. The transceivers 310, 320 include electronic and/or radio frequency circuits such as antennas. The antennas may be in form of a coil, a printed circuit board, etc.

As discussed above, the vehicle 100 transceiver(s) 310 are mounted underneath the vehicle 100 exterior surface 105. The exterior surface 105 as usually understood is an outer surface of a vehicle 100 body. The vehicle 100 body may be formed of metal, plastic, composite material, etc. The transceiver 310 may be mounted underneath the exterior surface 105, e.g., 1 cm, below the exterior surface 105. Thus, while the control device 150 is placed on the exterior surface 105 above the exterior surface 105, a distance d between the transceivers 310, 320 is less than or equal 4 cm. For example, the control device 150 transceiver 320 may be mounted inside the control device 150 to a bottom 340 of the device 150.

The control device 150 may be attachable to the vehicle 100 exterior 105, e.g., magnetically. For example, the control device 150 may include a magnet 300 in form of a layer attached to the bottom 340 of the device 150 and/or disposed in a device 150 packaging. As discussed above, the vehicle 100 body may be formed of metal and/or at least include metal. Thus, the magnet 300 may releaseably attach the control device 150 to the vehicle 100 exterior surface 105. Additionally or alternatively, a magnet may be mounted underneath the vehicle 100 exterior surface 105 to releaseably attach the control device 150 to the exterior surface 105. Additionally or alternatively, the vehicle 100 and/or the control device 150 may include mechanical attachments such as a ball or other shape that snaps or is otherwise secured in a socket, a pin, a clip, a bolt, etc. to releaseably attach the control device 150 to the vehicle 100 exterior surface 105.

In one example, a position on the exterior surface 105 at which the transceiver(s) 310 are mounted underneath the exterior surface 105 may be marked, e.g., a printed symbol, etc., may be provided on the exterior surface 105 and/or such position may be specified in a vehicle 100 user manual. A user, e.g., a service technician, may attach the control device 150 to the exterior surface 105 where, for example, it has a marking. The vehicle 100 computer 110 may be programmed to receive the instruction from the control device 150 only when the control device 150 is attached to a section of the exterior surface 105 above the transceiver 310, e.g., because otherwise the distance d may exceed 4 cm. As discussed above, the NFC transceivers 310, 320 may communicate when located within close proximity, e.g., 4 cm, of one another. Thus, the computer 110 may, in one example, receive the instruction only when the distance d is within 4 cm. In one example, the computer 110 may be programmed to determine whether the control device 150 is attached to the vehicle 100 exterior surface 105 based on the received instruction, e.g., a request to start communication with the vehicle 100 computer 110. The computer 110 may be programmed to determine whether the received instruction is from a control device 150 based on stored information in a computer 110 memory. For example, an identifier of the control device 150 may be stored in the computer 110 memory.

The computer 110 may be programmed to receive the instruction from the control device 150 transceiver 320. Thus, a control device 150 processor may be programmed to transmit the instruction, e.g., including the control device 150 identifier, via the transceivers 320, 310 to the vehicle 100 computer 110.

The computer 110 may be additionally programmed to determine whether the vehicle 100 can be controlled based on the instructions received from the control device 150. For example, the computer 110 may output a request for approval to the vehicle 100 HMI 140 and actuate the vehicle 100 actuators 120 only upon receiving a confirmation, e.g., a user input, from the vehicle 100 HMI 140. In one example, the computer 110 may activate a vehicle 100 non-autonomous mode of operation, and actuate the vehicle 100 actuators 120 based on received instructions, e.g., to move forward, move backward, brake, and/or steer, etc., from the control device 150. The control device 150 may be programmed to transmit such instructions to the vehicle 100 computer 110 based on received inputs via control device 150 input elements 210, the steering wheel 220, etc.

The vehicle 100 may include multiple transceivers 310. In one example, the vehicle 100 may include a first transceiver 310 mounted under a vehicle 100 trunk 160 door and a second transceiver 310 mounted under a vehicle 100 hood 170. Thus, the computer 110 may be programmed to determine whether the control device 150 is attached to the vehicle 100 trunk 160 exterior surface 105 based on a location (in this context, a location, i.e., a location of the control device 150 with respect to the surface 105, is a position of the device 150 on the surface 105) of the first transceiver 310. Additionally or alternatively, the computer 110 may be programmed to determine whether the control device 150 is attached to the vehicle 100 hood 170 exterior surface 105 based on a location of the second transceiver 310. Each of the first and second transceivers 310 may have a substantially unique identifier. Therefore, the computer 110 may be programmed to determine whether the control device 150 is attached to the trunk 160 or the hood 170 based on a transceiver 310 identifier that is typically included in the received instruction.

As discussed above, the control device 150 may transmit instructions for a forward movement and/or a backward movement of the vehicle 100. However, a backward movement of the vehicle 100 while the control device 150 is attached to the trunk 160 (see FIG. 1A) may pose a risk for a user standing behind the vehicle 100 to operate the control device 150. Similarly, a forward movement of the vehicle 100 (see FIG. 1B) while the control device 150 is attached to the hood 170 may pose a risk for a user standing in front of the vehicle 100 to operate the control device 150.

In one example, the computer 110 may be programmed to prevent a vehicle 100 backward movement upon determining that the control device 150 is attached to a vehicle 100 trunk 160 exterior surface 105. The computer 110 may be further programmed to prevent a vehicle 100 backward movement upon determining that the instruction is received via the first transceiver 310.

The computer 110 may be programmed to prevent a vehicle 100 forward movement upon determining that the control device 150 is attached to a vehicle 100 hood 170 exterior surface 105. The computer 110 may be programmed to prevent a vehicle 100 forward movement upon determining that the instruction is received via the second transceiver 310.

Processing

Figure 4:
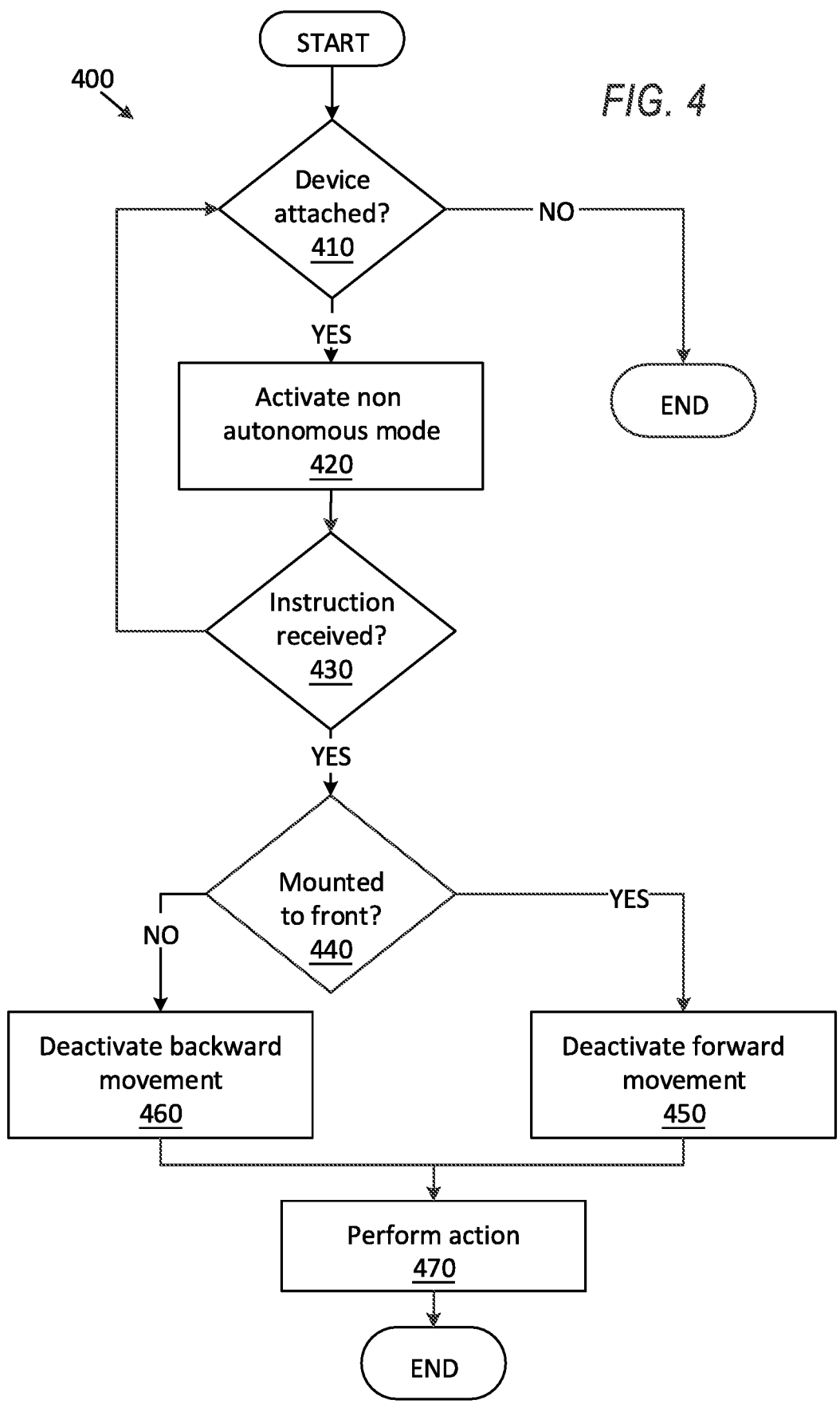
FIG. 4 is a flowchart of an exemplary process to control vehicle operation.

FIG. 4 is a flowchart of an exemplary process 400 for controlling vehicle 100 operation. For example, the vehicle 100 computer 110 may be programmed to execute blocks of the process 400.

The process 400 begins in a decision block 410, in which the computer 110 determines whether a control device 150 is attached to the vehicle 100 exterior surface 105, e.g., trunk 160. The computer 110 may be programmed to make such determination upon receiving an identifier of the control device 150 via the vehicle 100 transceiver 310, i.e., the location or position of the device 150 may be determined according to a stored location or position of a transceiver 310 reporting receipt of the control device 150 identifier. Additionally, the computer 110 may be programmed to transmit via the transceiver 310 a response to receiving the identifier of the control device 150. For example, the computer 110 may be programmed to transmit a confirmation message to the control device 150. If the computer 110 determines that the control device 150 is attached to the vehicle 100 exterior surface 105, then the process 400 proceeds to a block 420; otherwise the process 400 ends (i.e., the vehicle 100 may be operated in any applicable mode, e.g., autonomous mode without instructions received from the control device 150, a manual mode where the vehicle 100 is conventionally operated by a human operator according to conventional controls in the vehicle 100, etc.).

In the block 420, the computer 110 activates a vehicle 100 non-autonomous mode. In other words, the computer 110 may be programmed to activate an operation of the vehicle 100 based on instruction(s) from the control device 150.

Next, in a decision block 430, the computer 110 determines whether an instruction is received from the control device 150. An instruction may include an instruction to move forward, to move backward, to brake, and/or to steer. The computer 110 may be programmed to determine that the instruction is received from the control device 150 upon determining that the instruction is received via the transceiver 310. If the computer 110 determines that an instruction is received from the control device 150, then the process 400 proceeds to a decision block 440; otherwise the process 400 returns to the decision block 410.

In the decision block 440, the computer 110 determines whether the control device 150 is attached to a front, e.g., the hood 170, or a rear, e.g., the trunk 160, of the vehicle 100. In one example, the vehicle 100 includes the first transceiver 310 mounted underneath the trunk 160 door and the second transceiver 310 mounted underneath the hood 170. The computer 110 may be programmed to determine whether the control device 150 is attached to the front or rear of the vehicle 100 based on identifying one of the transceivers 310 via which the instruction is received. If the computer 110 determines that the control device 150 is mounted to the front, e.g., the hood 170, of the vehicle 100, then the process 400 proceeds to a block 450; otherwise the process 400 proceeds to a block 460.

In the block 450, the computer 110 deactivates forward movement of the vehicle 100. For example, the computer 110 may be programmed to ignore an instruction to move forward. Alternatively or additionally the computer 110 could activate an emergency brake or the like.

In the block 460, the computer 110 deactivates backward movement of the vehicle 100. For example, the computer 110 may be programmed to ignore an instruction to move backward. Alternatively or additionally the computer 110 could activate an emergency brake or the like.

Next, in a block 470, the computer 110 causes the vehicle 100 to perform an action. The computer 110 may be programmed, for example, to instruct a vehicle 100 actuator 120 to move and/or steer the vehicle 100. The computer 110 can be programmed to ignore the received instruction if the computer 110 has been deactivated to perform the received instruction. For example, the computer 110 may be programmed to ignore a move forward instruction upon determining that the forward movement of the vehicle 100 is deactivated (see block 450). Additionally or alternatively, the computer 110 may be programmed to ignore a move backward instruction upon determining that the backward movement of the vehicle 100 is deactivated (see block 460). Following the block 470, the process 400 ends, or alternatively returns to the decision block 410, although not shown in FIG. 4.

Figure 5:
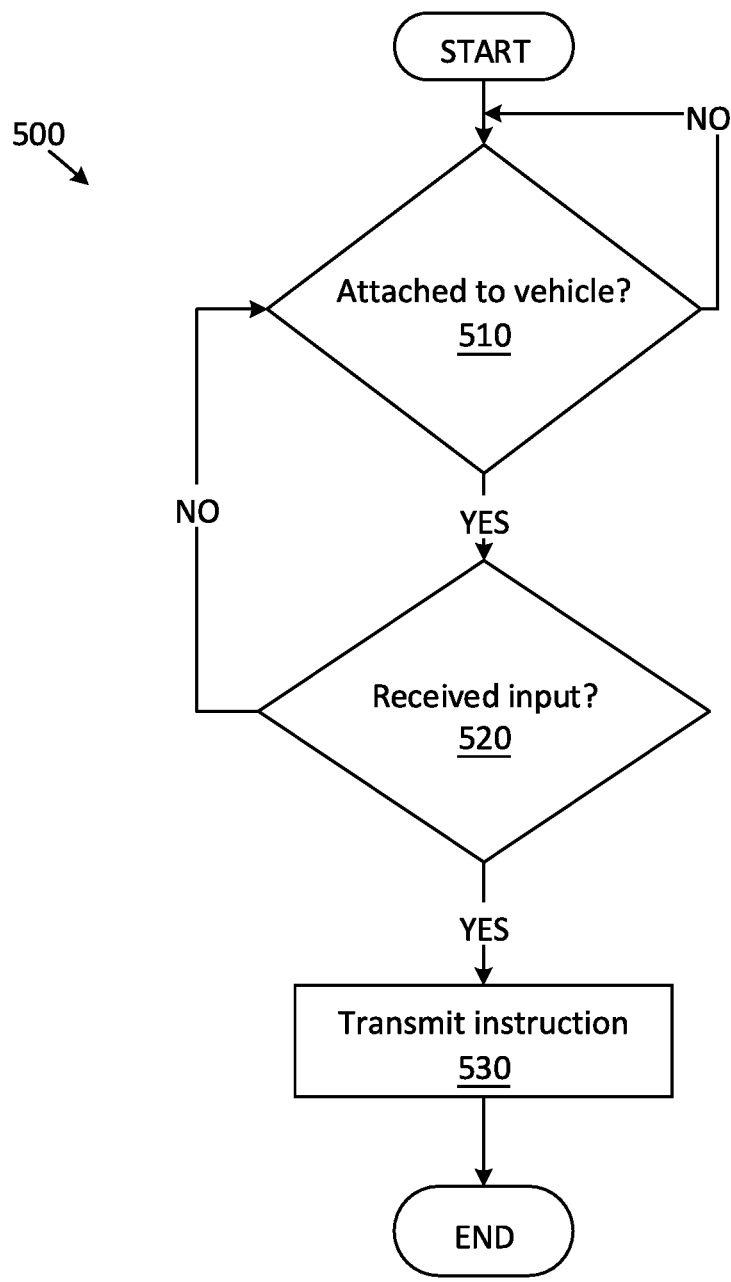
FIG. 5 is a flowchart of an exemplary process for transmitting an operation instruction to the vehicle.

FIG. 5 is a flowchart of an exemplary process 500 of transmitting an instruction from the control device 150. In one example, a processor of the control device 150 may be programmed to execute block of the process 500.

The process 500 begins in a decision block 510, in which the control device 150 processor determines whether the device 150 is attached to the vehicle 100. In one example, the control device 150 determines whether the device 150 is attached to the vehicle 100 upon receiving a response from the vehicle 100 computer 110 via the transceivers 310, 320 (see block 410 in FIG. 4), e.g., confirming that a message from the device 150 has been received by the computer 110 via one of the transceivers 310, 320. If the control device 150 processor determines that the device 150 is attached to the vehicle 100, then the process 500 proceeds to a decision block 520; otherwise the process 500 returns to the decision block 510.

In the decision block 520, the control device 150 processor determines whether a user input is received, e.g., from the input elements 210, the steering wheel 220, etc. If the control device 150 processor determines that a user input is received, then the process 500 proceeds to a block 530; otherwise the process 500 returns to the decision block 510.

In the block 530, the control device 150 transmits an instruction via the device 150 transceiver 320 and the vehicle 100 transceiver 310 to the vehicle 100 computer 110. In one example, the control device 150 processor may be programmed to determine the instruction based on the received user input, e.g., rotation of the steering wheel 220, pushing the input element 210, etc.

Following the block 530, the process 500 ends, or alternatively returns to the decision block 510, although not shown in FIG. 5.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH, an EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A computer, programmed to:
receive, in a vehicle, an instruction, via an ultra-short-range transceiver that is mounted underneath a vehicle exterior surface;

detect a location of a control device from communications via the ultra-short-range transceiver;

then limit movement of the vehicle based on the detected location of the control device, including preventing a vehicle backward movement upon the detected location being a vehicle trunk exterior surface, and preventing a vehicle forward movement upon the detected location being a vehicle hood exterior surface.

2. The computer of claim 1, further programmed to determine the location of the control device based on a location of the ultra-short-range transceiver in the vehicle, wherein a memory of the computer stores information including the location of the ultra-short-range transceiver.

3. The computer of claim 1, further programmed to receive an instruction from the control device, wherein the control device is attachable to the vehicle exterior surface.

4. The computer of claim 3, wherein the received instruction includes at least one of a move forward, move backward, brake, and steer request.

5. The computer of claim 3, wherein the control device includes a second ultra-short-range transceiver.

6. The computer of claim 5, wherein the second ultra-short-range transceiver is a Near Field Communication transceiver.

7. The computer of claim 5, further programmed to determine whether the control device is attached to the vehicle exterior surface based on the received instruction.

8. The computer of claim 1, wherein the ultra-short-range transceiver is a Near Field Communication transceiver.

9. A vehicle, comprising:
an ultra-short-range transceiver mounted underneath an exterior surface of the vehicle; and
a computer, in the vehicle, programmed to:
receive, an instruction, via the ultra-short-range transceiver; and
detect a location of a control device from communications via the ultra-short-range transceiver;
then limit movement of the vehicle based on the detected location of the control device, including,
preventing a vehicle backward movement upon the detected location being a vehicle trunk exterior surface, and
preventing a vehicle forward movement upon the detected location being a vehicle hood exterior surface.

10. The vehicle of claim 9, wherein the computer is further programmed to receive the instruction from the control device, wherein the control device is attachable to the exterior surface of the vehicle.

11. The vehicle of claim 10, wherein the computer is further programmed to receive the instruction from a second wireless transceiver included in the control device, wherein the second wireless transceiver of the control device communicates with the ultra-short-range transceiver mounted underneath the exterior surface of the vehicle.

12. The vehicle of claim 10, wherein the control device is magnetically attachable to the exterior surface of the vehicle.

13. The vehicle of claim 10, wherein the computer is further programmed to receive the instruction from the control device only when the control device is attached to a section of the exterior surface of the vehicle above the transceiver.

14. The vehicle of claim 9, wherein the ultra-short-range transceiver includes a first transceiver mounted under a vehicle trunk door and a second transceiver mounted under a vehicle hood.

15. The vehicle of claim 14, wherein the first transceiver is a first Near Field Communication transceiver and the second transceiver is a second Near Field Communication transceiver.

* * * * *